Oct. 9, 1923.
1,470,510
E. TAYLOR
BELT CONNECTOR
Filed March 19, 1923
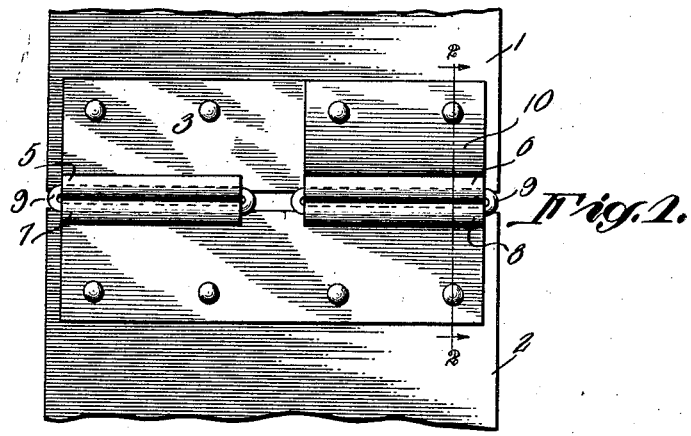
E. Taylor,
Inventor Patented Oct. 9, 1923.

1,470,510

UNITED STATES PATENT OFFICE.

EDWIN TAYLOR, OF EDWARDSVILLE, KANSAS.

BELT CONNECTER.

Application filed March 19, 1923. Serial No. 626,077.

*To all whom it may concern:*

Be it known that I, EDWIN TAYLOR, a citizen of the United States, residing at Edwardsville, in the county of Wyandotte and State of Kansas, have invented a new and useful Belt Connecter, of which the following is a specification.

This invention relates to belt connecters of the hinge type.

The object of the invention is to provide a device of this character which will effectively and flexibly connect and hold the ends of a belt together and which is so constructed as to resist strains incident to heavy pulling and avoid the annoyance incident to breakage of the belt fasteners.

Another object is to provide a connecter of this character in which opposed hooks are secured to the belt ends and flexibly connected by a third member.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of the meeting ends of a plate equipped with one form of this improved invention.

Fig. 2 is a transverse section taken on the line 2—2 of Fig. 1.

Fig. 3 is a bottom plan view showing a slightly different arrangement and form of connecter.

Fig. 4 is a transverse section taken on the line 4—4 of Fig. 3.

Fig. 5 is a view similar to Fig. 1 showing still another form of the invention, and Fig. 6 is a longitudinal section taken on the line 6—6 of Fig. 5.

In the embodiment illustrated in Figs. 1 and 2, the bolt ends 1 and 2 are shown having heavy metal plates 3 and 4 riveted to the outer faces thereof adjacent the meeting edges of the belt ends. These plates have their opposed edges rolled to form inwardly opening hooks 5, 6 and 7 and 8 which are designed to be engaged with links 9 whereby the plates are flexibly connected to form what may be termed a multiple unit belt hinge. The pull and wear in a belt hinge of this character are mainly at the sides of the hooks and ends of the links and consequently a single unit hinge would not be desirable for use on a wide belt since a single unit hinge a foot long would deliver little or no more power than one two inches long.

It is of course understood that any desired number of these links may be employed and for a six inch belt doing heavy duty it would be desirable to use four units. The hooks in which the links are mounted may stand open or be closed and if left open are preferably protected by shields, such as that shown at 10 in Figs. 1 and 2.

If desired, one hook in a unit may be flexibly closed upon its connecting link while the companion hook may remain open as is shown clearly in Figs. 2, 4 and 6, thereby adapting it for a quick connection and disconnection.

The shields shown at 10 in Figs. 1 and 2 for closing the open hook of the hinge protects this hook from injuring adjacent objects.

In Figs. 1 and 2, the hinge members 3 and 4 are located on the outer faces of the belt ends with the hinge joint projecting outwardly or these joints may be turned inwardly and be between the ends of the belt for more perfect protection as shown in Figs. 3 and 4. This location of the joint protects the connecter against injury and lessens the impact upon a tightener pulley.

In Figs. 3 and 4 a single unit hinge is shown for use on a medium width belt and comprises the plates $3^a$ and $4^a$ riveted to the outer faces of the belt ends 1 and 2 with spacers 11 and 12 between them and said ends to locate the inturned hooks 13 and 14 between the belt ends.

In Figs. 5 and 6 a single unit hinge is shown connecting the ends 1 and 2 of a comparatively narrow belt and which is similar to one of the units shown in Figs. 1 and 2, the plates $3^b$ and $4^b$ being arranged on the outer faces of said ends with the hooks 15 and 16 projecting outwardly and one being open and the other closed.

Various changes in the form, shape, proportion and other minor details of construction may be made without departing from the spirit or sacrificing any of the advantages of the claimed invention.

I claim:—

A belt connecter comprising plates adapted to be secured to the ends of the belt to be connected and having their opposed edges bent inwardly to form hook-like bearings, closed links engaged with said bearings to flexibly connect the plates, and a shield for closing and protecting the hooks.

In testimony that I claim the foregoing as my own, I have hereto affixed my signature in the presence of two witnesses.

EDWIN TAYLOR.

Witnesses:
GERTRUDE TAYLOR,
LYDIA S. TAYLOR.